(12) United States Patent
Chang

(10) Patent No.: US 6,735,080 B1
(45) Date of Patent: May 11, 2004

(54) HEAT DISSIPATION STRUCTURE OF MOBILE RACK

(76) Inventor: Cheng Chun Chang, 11F-2, No. 11, Lane 202, Jing-Shing Road, Wen-Shan DT, Taipei (TW)

( * ) Notice: Subject to any disclaimer, the term of this patent is extended or adjusted under 35 U.S.C. 154(b) by 0 days.

(21) Appl. No.: 10/422,162

(22) Filed: Apr. 24, 2003

(30) Foreign Application Priority Data

Mar. 27, 2003 (TW) ..................................... 92204763 U

(51) Int. Cl.⁷ ............................................... H05K 7/20
(52) U.S. Cl. ...................... 361/695; 361/690; 361/694; 454/184
(58) Field of Search ................................ 361/690, 694, 361/695; 174/16.1, 16.3; 165/80.3, 104.33, 122; 454/184

(56) References Cited

U.S. PATENT DOCUMENTS

| | | | | |
|---|---|---|---|---|
| 5,694,290 A | * | 12/1997 | Chang | 361/685 |
| 5,886,639 A | * | 3/1999 | Behl et al. | 340/635 |
| 6,359,779 B1 | * | 3/2002 | Frank et al. | 361/687 |
| 6,388,878 B1 | * | 5/2002 | Chang | 361/687 |
| 6,565,163 B2 | * | 5/2003 | Behl et al. | 312/223.1 |
| 6,567,271 B2 | * | 5/2003 | Stone et al. | 361/724 |
| 6,628,518 B2 | * | 9/2003 | Behl et al. | 361/687 |

* cited by examiner

*Primary Examiner*—Boris Chervinsky
(74) *Attorney, Agent, or Firm*—Quintero Law Office

(57) ABSTRACT

The present invention discloses a heat dissipation structure of a mobile rack, comprising a fan disposed on a front panel and a back panel inside a sealed enclosure, and connected to a circuit of a power supply section on the back panel; when the fans are operating, a wind tunnel effect is taken place inside the enclosure to discharge the heat produced by a data storage device.

20 Claims, 3 Drawing Sheets

HEAT DISSIPATION STRUCTURE OF MOBILE RACK

BACKGROUND OF THE INVENTION

1. Field of the Invention

The present invention relates to a heat dissipation structure of a mobile rack, more particularly to a heat dissipation structure having a fan each on the front panel and the back panel of a sealed enclosure to produce a wind tunnel effect.

2. Description of the Related Art

Due to the fast development of information technologies, computer hardware equipments are making changes to cope with the changing requirements. For example, the hard disk drive at early stage is installed in a computer housing, but due to the consideration of data storage, backup, or even the portability and security of confidential information, the so-called "Mobile Rack" such as the hard disk drive mobile rack is introduced to meet the requirements, which definitely brings lots of convenience to users.

However, there are requirements for high-speed transmission and reliability and the Serial ATA (SATA) interface is expected to replace the IDE interface for the data storage device specification. Since the SATA interface data storage device has the advantages of large capacity and fast speed, therefore the temperature of the heat produced by the data storage device, similarly to that of the central processing unit (CPU), gets higher and higher. The manufacturers are facing the sane issue of heat dissipation.

The prior art mobile rack is taken for example. In order to expedite the heat dissipation of an IDE interface data storage device in an enclosure, it is generally to have at least one intake fan installed on the front panel to extract the hot air accumulated in the external frame and discharge the heat into the main computer system for having a better heat dissipation effect. However, the shortcomings of such heat dissipation structure reside on that (1) since there is no gap between the bottom panel and the data storage device in the enclosure, therefore it is difficult to dissipate the heat at the bottom of the data storage device and will reduce the heat dissipation effect; (2) Since the frame is disposed in the installation space of the main computer system, it is necessary to remove the computer system to take out the frame for maintaining or replacing the fan if the extractive fan breaks down due to its continuous operation for a long time. Such arrangement causes inconvenience and needs improvement.

In view of the above shortcomings, the present inventor herein with many years of practical experience in the design, development, manufacturing and marketing of mobile racks and external frames enhanced the design and overcame the shortcomings of the prior-art computer mobile rack having poor heat dissipation and inconvenience for maintenance or replacement by performing a series of researches and developments and finally succeeded to invent the "heat dissipation structure of mobile rack" in accordance with the present invention.

SUMMARY OF THE INVENTION

The primary objective of the present invention is to provide a heat dissipation structure of a mobile rack, comprising a fan each disposed on the front panel and the back panel of a sealed enclosure, and connected to a power supply section disposed at the back panel by a circuit such that when the two fans are running, a wind tunnel effect is produced in the enclosure to discharge the heat generated by the data storage device.

The secondary objective of the present invention is to provide a heat dissipation structure of a mobile rack, comprising a heightened device at the bottom panel in the enclosure for heightening the data storage device and forming a gap between the data storage device and the bottom panel.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
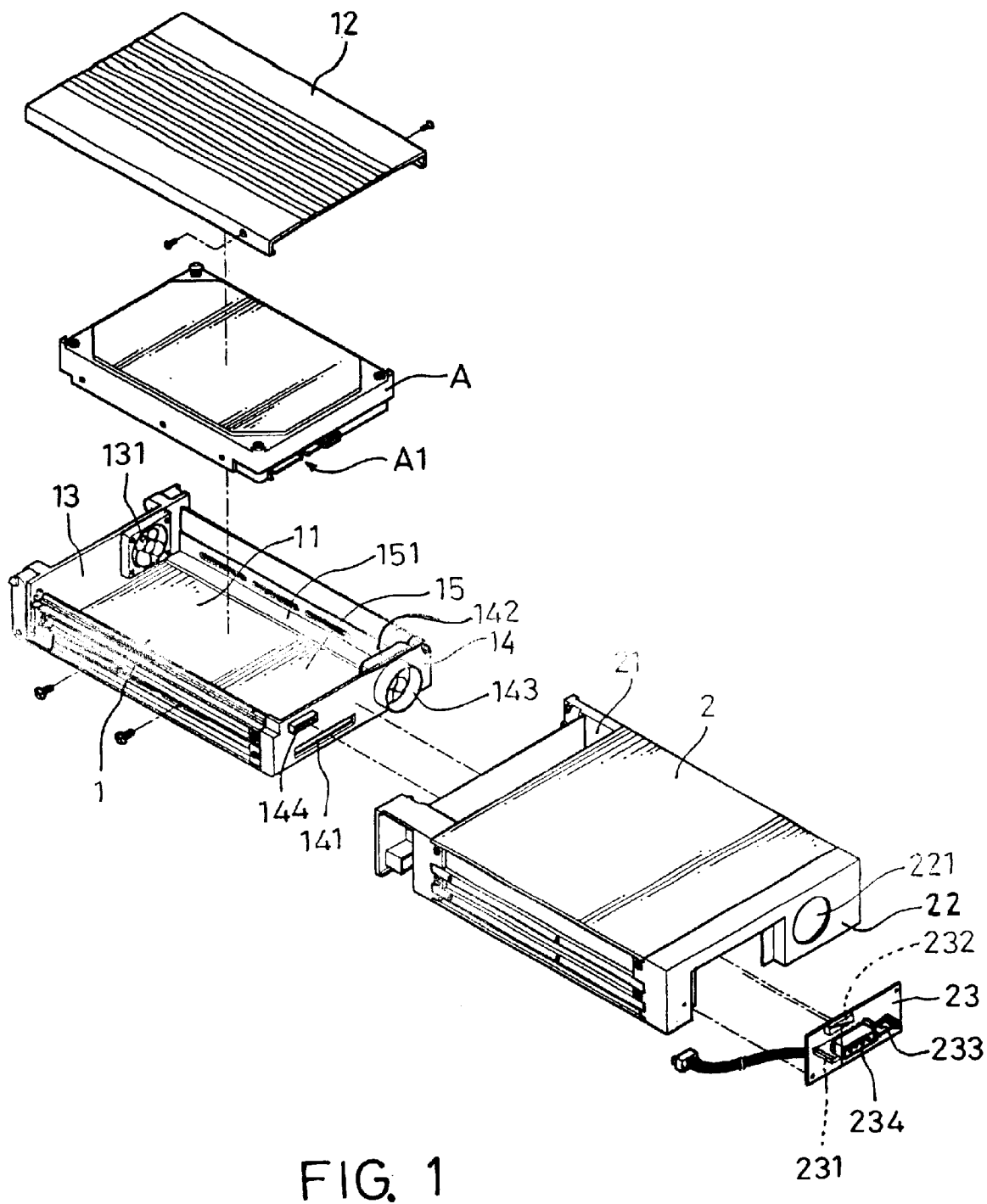
FIG. 1 is a perspective diagram of the disassembled parts of the structure according to the present invention.
Figure 2:
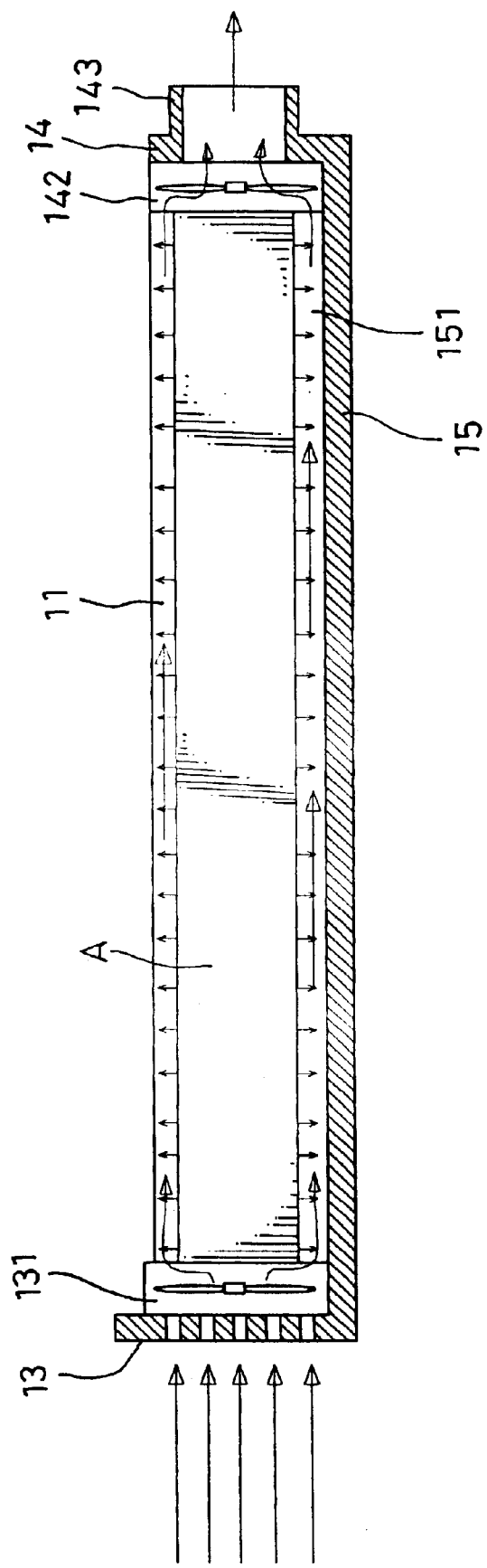
FIG. 2 is a cross-sectional diagram of the heat dissipation path of assembled structure of the present invention.
Figure 3:
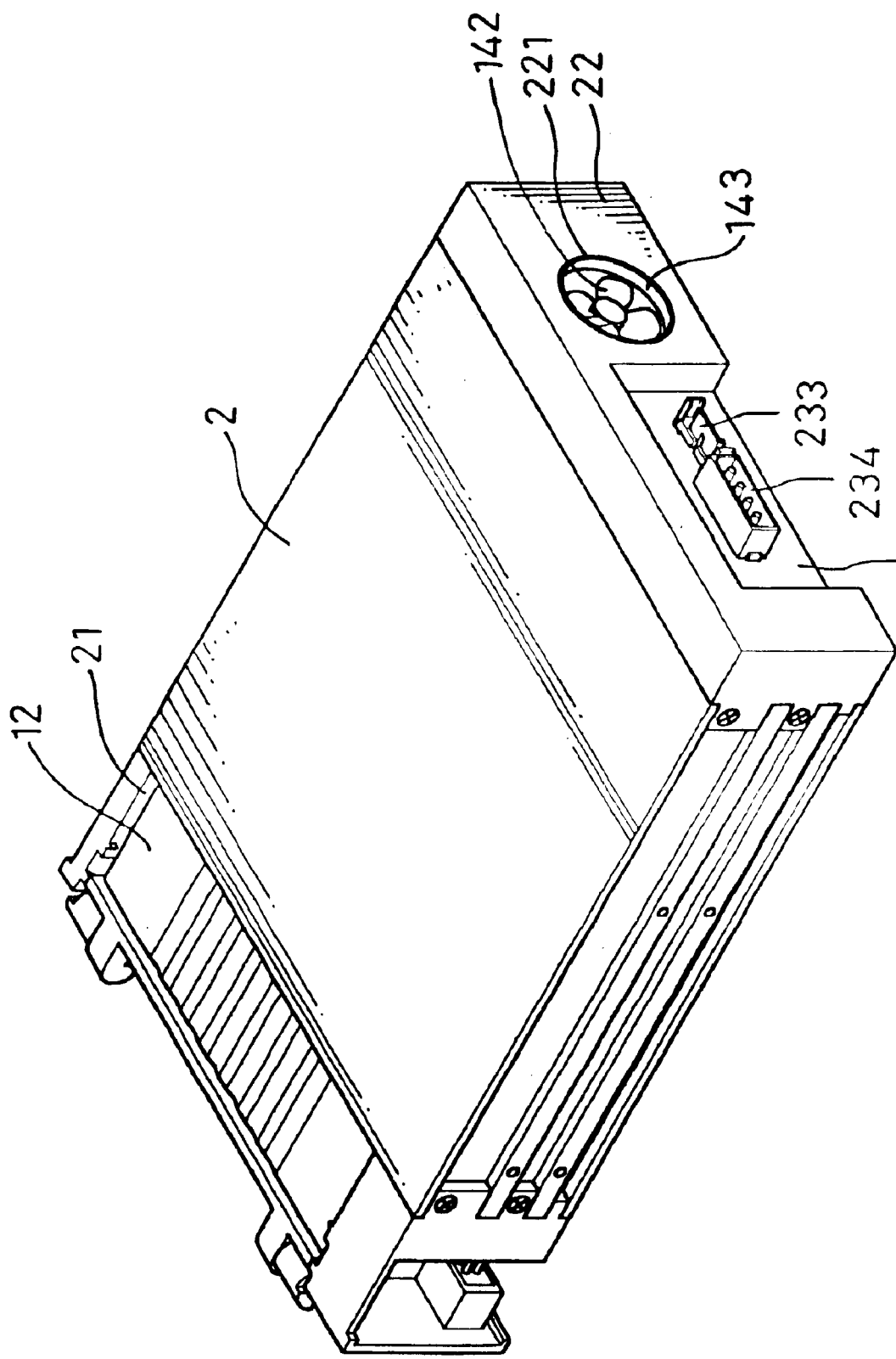
FIG. 3 is a perspective diagram of the assembled structure of the present invention.

Refer to FIGS. 1 to 3. In the figures, the mobile rack according to the present invention basically comprises an enclosure 1 and an external frame 2.

The enclosure 1 is box body with an open top and a chamber 11 in the enclosure 1 for accommodating and positioning a data storage device A such as a SATA interface hard disk, and having a top panel 12 for sealing the top of the chamber 11 to form a sealed enclosure 1.

The technical feature of the enclosure 1 of this invention resides on that it has a fan disposed on the front panel 13 and a relay connecting section 141 (which is a hollow connecting groove as shown in the figure) disposed on the back panel corresponsive to the connecting section of the signal and power supply of the data storage device A and the external frame 2 for receiving the embedment of the external frame connector 231 of the external frame 2 and connecting to the SATA interface signal and the power supply connector. However, the present invention includes but not limited to the above. If the data storage device is an IDE or other interface, the relay connecting section 141 is a relay connector having the functions of integrating and separating the signal and the power supply. In addition, the back panel 14 has a fan 142 preferably disposed corresponsive to the fan 131, wherein the two fans preferably provide wind in the same direction. For example, if the fan 131 is an intake fan and the fan 142 is an extraction fan, such arrangement can give a better airflow. In the mean time, the fan 142 at the back panel 14 has a wind pipe 143 provided from its external side to prevent the heat from being accumulated in the external frame body 2, such that the accumulated heat cannot be discharged.

A power supply section 144 is disposed at the back panel 14 for supplying the power for the operation of the two fans 131, 142 and coupled to the power output section 232 corresponsive to the external frame 2. However, it is a prior art and will not be described here.

Further, to let the bottom of the data storage device A have the heat dissipation effect, a heightened device 151 is protruded from the bottom panel 15 of the enclosure 1. The heightened device 151 could be a support member in the shape of a bar, a rib, a latch, or a lump for heightening the data storage device, so that a bigger gap is formed between the data storage device A and the bottom panel 15, and the intake airflow can flow through the upper and lower sections of the data storage device and then be extracted by the fan 142. Such arrangement defines the heat dissipation with a wind tunnel effect.

The external frame 2 is a hollow frame being installed in the installation space of a computer system, wherein a circuit board 23 is disposed at the back panel 22 of the external frame 2, and an external frame connector 232 and a power supply output section 234 are disposed respectively on the inner sides of the external frame 2 at the positions corresponsive to the relay connecting section 141 and the power supply section 144, and a signal connector 233 and a power input section 234 are disposed on the outer sides of the external frame 2. The technical feature of this invention resides on that a pipe hole 221 is disposed on the back panel 22 corresponding to the position of the wind pipe 143 for receiving or passing through the wind pipe 143, such that the hot air extracted by the fan 142 is discharged into the main computer system as shown in FIG. 2 and then discharged by the heat dissipation system.

Therefore, by the implementation of this invention, the enclosure has two fans to produce the wind tunnel effect in order to discharge the heat generated by the data storage device rapidly. In addition, a pipe hole is disposed at the fan position at the back panel of the enclosure, so that the heat can be discharged immediately. Furthermore, the external frame of this invention does not include a heat dissipation fan and will not have the trouble and inconvenience of disassembling the computer system for maintenance. Such arrangement is regarded as a novel good idea for the object of this sort.

While the present invention has been described by the most practical and preferred embodiments, it is understood that this invention is not limited to the disclosed embodiments but is intended to cover various arrangements included within the spirit and scope of the broadest interpretations and equivalent arrangements.

What is claimed is:

1. A heat dissipation structure of movable rack for a data storage device, the movable rack having an external frame, the heat dissipation structure comprising an enclosure received in the external frame for holding the data storage device, the enclosure including a front panel, a back panel, a fan disposed on each of the front panel and the back panel and electrically coupled to a power supply section at the back panel by a circuit such that a wind tunnel effect is produced in said enclosure during the operation of said two fans to discharge the heat produced by the data storage device.

2. The heat dissipation structure of movable rack of claim 1, wherein said enclosure further comprises a bottom panel including a heightened device for heightening said data storage device and forming a gap between said data storage and said bottom panel.

3. The heat dissipation structure of movable rack of claim 2, wherein said heightened device is a support member in a shape selected from the collection of a bar, a rib, a latch, and a lump.

4. The heat dissipation structure of movable rack of claim 1, wherein said back panel of the enclosure protrudes a section of wind pipe from the outer side of the corresponding fan, and said external frame has a pipe hole corresponding to the wind pipe for accommodating the wind pipe and through which the wind pipe extends.

5. The heat dissipation structure of movable rack of claim 1, wherein said power supply section is coupled with a power supply output section disposed on the inner side of a circuit board on a back panel of the external frame.

6. The heat dissipation structure of movable rack of claim 5, wherein said enclosure further comprises a relay connecting section, and said circuit board having an inner side and outer sides, wherein its inner side has an external frame connector for coupling with a relay connecting section of said enclosure, and comprises a signal connector and a power supply input section respectively on the outer sides.

7. The heat dissipation structure of movable rack of claim 1, wherein said two fans are disposed corresponding to each other.

8. The heat dissipation structure of movable rack of claim 1, wherein said two fans have opposite wind directions, one being an intake fan, and the other being an extraction fan.

9. The heat dissipation structure of movable rack of claim 1, wherein said enclosure has a top panel to seal the top of the enclosure.

10. A mobile rack for a data storage device, comprising:
    an enclosure for receiving the data storage device, the enclosure comprising a front panel and a back panel;
    an external frame for receiving the enclosure; and
    a first and second fan disposed respectively on the front and back panel.

11. The mobile rack as claimed in claim 10, wherein the back panel of the enclosure comprises an outwardly protruding wind pipe corresponding to the second fan.

12. The mobile rack as claimed in claim 11, wherein the external frame comprises a pipe hole for receiving the wind pipe.

13. The mobile rack as claimed in claim 10, wherein the enclosure further comprises a bottom panel including a support member for elevating the data storage device such that a gap is formed between the data storage device and the bottom panel.

14. The mobile rack as claimed in claim 13, wherein the support member is a bar, rib, latch or lump.

15. The mobile rack as claimed in claim 10, wherein the back panel further comprises a power supply section electrically connected to the first and second fan.

16. The mobile rack as claimed in claim 15, wherein the external frame further includes a power supply output section electrically connected to the power supply section.

17. The mobile rack as claimed in claim 10, wherein the back panel further comprises a relay connecting section.

18. The mobile rack as claimed in claim 17, wherein the external frame further comprises a circuit board disposed corresponding to the relay connecting section.

19. The mobile rack as claimed in claim 10, wherein said two fans are disposed corresponding to each other.

20. The mobile rack as claimed in claim 10, wherein said two fans have opposite wind directions, one being an intake fan, and the other being an extraction fan.

* * * * *